United States Patent
Ghoi et al.

(10) Patent No.: US 6,775,556 B1
(45) Date of Patent: Aug. 10, 2004

(54) DEVICE AND METHOD FOR PROCESSING CALL BETWEEN PRIVATE EXCHANGE NETWORK AND MOBILE COMMUNICATION NETWORK

(75) Inventors: Gi Moo Ghoi, Kyonggi-do (KR); Hwan Jong Kang, Kyonggi-do (KR); Pill O Hong, Kyonggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/576,998

(22) Filed: May 24, 2000

(30) Foreign Application Priority Data

May 25, 1999 (KR) ......................................... 1999-18886

(51) Int. Cl.[7] ............................ H04Q 7/20; H04M 1/00; H04B 1/38
(52) U.S. Cl. .................. 455/554.1; 455/445; 455/550.1; 455/553.1; 455/555; 455/426.2
(58) Field of Search ...................... 455/74, 74.1, 422.1, 455/424, 425, 426.1, 426.2, 445, 462, 465, 553.1, 554.1, 554.2, 555, 11.1, 88, 552.1, 550.1; 379/219, 231, 234

(56) References Cited

U.S. PATENT DOCUMENTS

| | | | | |
|---|---|---|---|---|
| 5,787,355 A | * | 7/1998 | Bannister et al. ........... | 455/554 |
| 5,839,067 A | * | 11/1998 | Jonsson ....................... | 455/422 |
| 6,181,938 B1 | * | 1/2001 | Salmela et al. ............. | 455/433 |
| 6,208,627 B1 | * | 3/2001 | Menon et al. .............. | 370/469 |
| 6,212,377 B1 | * | 4/2001 | Dufour et al. .............. | 455/433 |
| 6,223,055 B1 | * | 4/2001 | Cyr ............................. | 455/555 |
| 6,526,026 B1 | * | 2/2003 | Menon ....................... | 370/310 |

FOREIGN PATENT DOCUMENTS

WO      WO 98/27757    *   6/1998     ............ H04Q/7/20

* cited by examiner

Primary Examiner—William Trost
Assistant Examiner—Meless Zewdu
(74) Attorney, Agent, or Firm—Fleshner & Kim, LLP

(57) ABSTRACT

A system, device and method are provided for processing a call between a private exchange network and a mobile communication network in which a wireless trunk connection system or the like is used. A call is processed through the wireless trunk connection system in the private exchange network without passing through a public communication network when it is intended to establish a communication between an extension subscriber to the private exchange network and a subscriber to the mobile communication network. The wireless trunk connection system can have connections to a first mobile station for transmitting the destination telephone number dialed by the extension subscriber of the private exchange network to the mobile communication station through the first mobile station when the extension subscriber to the private exchange network requests communication services to the mobile communication network.

16 Claims, 6 Drawing Sheets

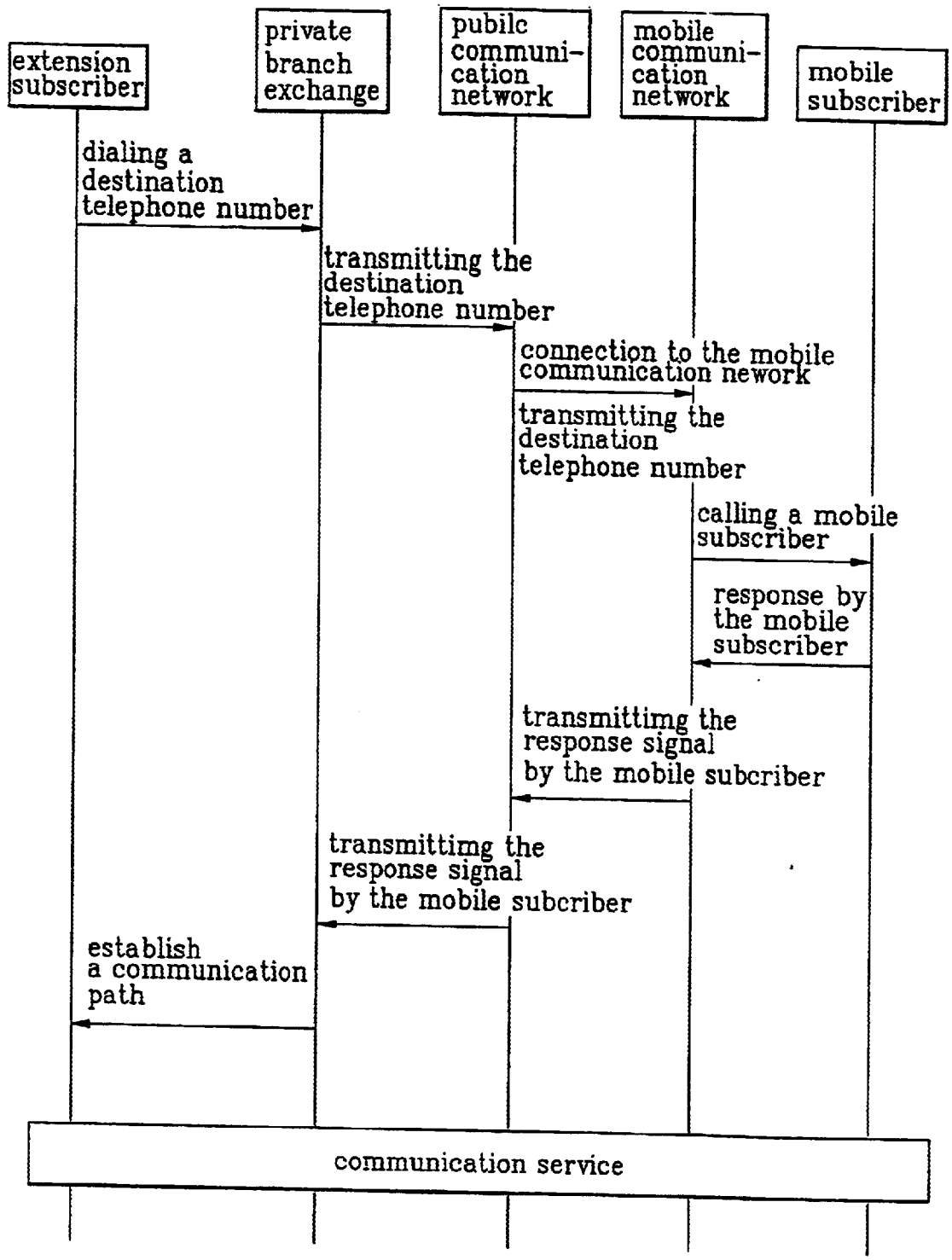

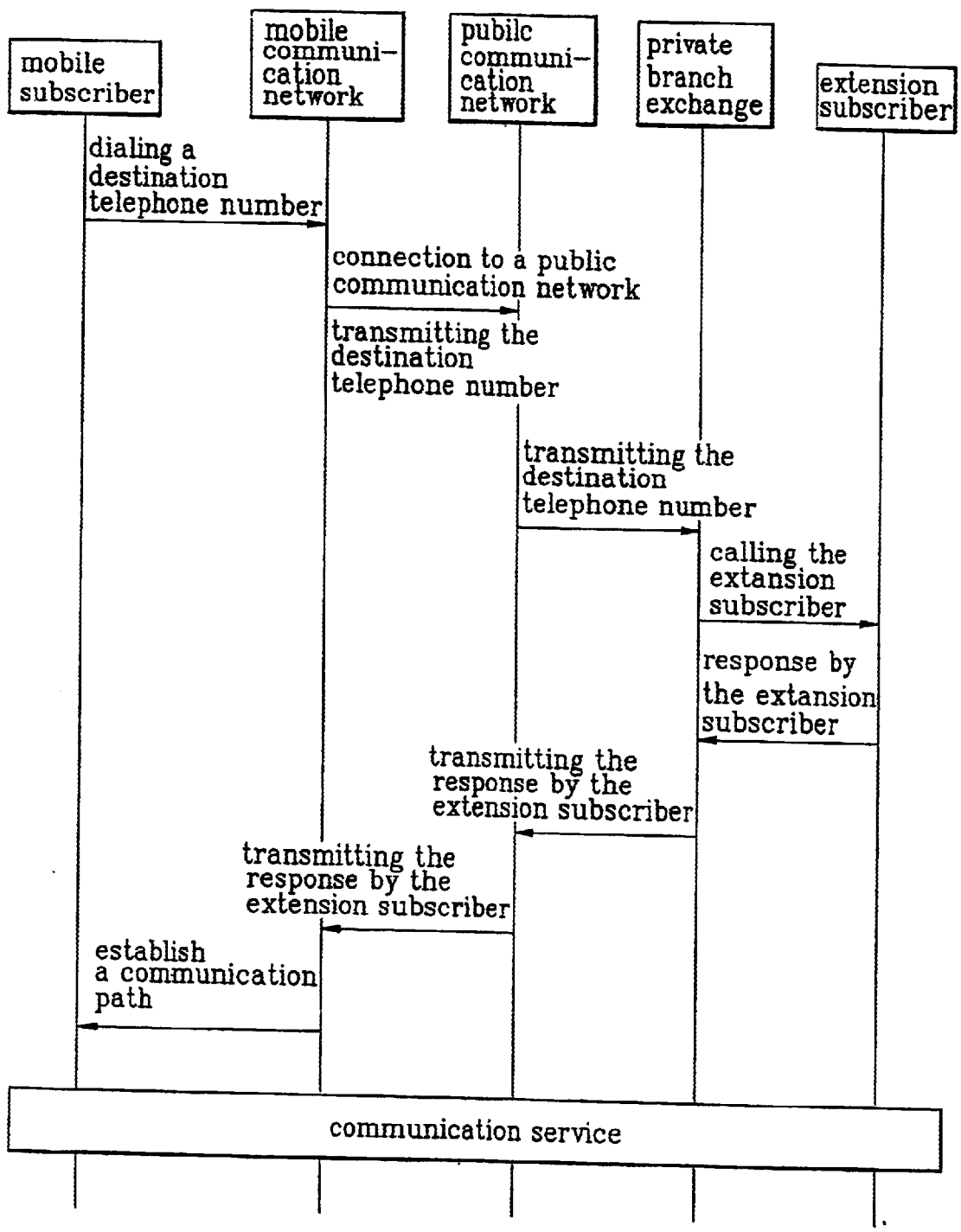

DEVICE AND METHOD FOR PROCESSING CALL BETWEEN PRIVATE EXCHANGE NETWORK AND MOBILE COMMUNICATION NETWORK

BACKGROUND OF THE INVENTION

1. Field of the Invention

The present invention relates to a device and a method for processing a call between a private exchange network and a mobile communication network, and more particularly, to a device and a method for processing a call between a private exchange network and a mobile communication network in which a public communication network is not used.

2. Background of the Related Art

In general, a private branch exchange in a private exchange network serves to establish a communication path through a main line or a private line according to an instruction from an extension subscriber. The private branch exchange makes a communication between both parties available, or detects a call signal from a wired exchange in the public communication network and establishes a communication path with the extension subscriber to make a communication available, and, cuts off the communication path upon completion of the communication so that the extension subscriber is ready for the next communication. A mobile communication service in the mobile communication network serves to divide an entire service area into a plurality of base stations for forming cells with a small sized service area, and controls the base stations using a mobile exchange so that a subscriber of the mobile communication network can establish a communication path with another subscriber of the mobile communication network or can establish a communication path through wire exchange in the public communication network, for making a communication available.

As shown in FIG. 1, a related art communication network includes the above described private exchange network and the mobile communication network interfacing at the public communication network 13. When an extension subscriber 11 connected to a private branch exchange 12 in a private exchange network intends to make communication with a mobile subscriber 16 registered on a mobile communication network 14, a call is processed through the public communication network 13 for providing the required communication service, which will be described with reference to FIG. 2A.

As shown in FIG. 2A, when the extension subscriber 11 in the private branch exchange 12 dials a destination telephone number with which the extension subscriber intends to communicate, the private branch exchange 12 analyzes numerals of the destination telephone number to verify the destination telephone number is a communication request for the private exchange network or the mobile communication network. That is, the dialed destination telephone number is determined to start with an area code or a mobile telephone call number, and if the dialed destination telephone number is neither the area code nor the mobile telephone call number, existence of a prefix is checked. If the dialed destination telephone number starts with either the area code or with the prefix without the area code, it is determined that the dialed destination telephone number is a request for communication to the public communication network 13, If the dialed destination telephone number starts with the mobile telephone call number, it is determined that the dialed destination telephone number is a request for communication to the mobile communication network 14. If the dialed destination telephone number has only an extension number without the area code, the mobile telephone call number, or the prefix, it is determined that the dialed destination telephone number is a communication request for another extension subscriber to a private exchange network.

According to the determination, if the dialed destination telephone number is a request for the private exchange network, the private branch exchange 12 calls a pertinent extension subscriber 11 and provides a communication service between the extension subscribers 11. If the analysis of the dialed destination telephone number reveals that the dialed destination telephone number is not a communication request for the private exchange network, the private branch exchange 12 transmits the dialed destination telephone number through a main trunk connected to a wire exchange (not shown) within the public communication network 13. Then, the wire exchange analyzes the dialed destination telephone number using the same method to verify the dialed destination telephone number is the communication request for the public communication network 13 or the mobile communication network 14. According to the wire exchange determination, if the dialed destination telephone number is a request for the public communication network 13, a pertinent wire subscriber is called to provide the communication service between the extension subscriber 11 in the private exchange network and the wire subscriber in the public communication network 13.

If the analysis of the dialed destination telephone number in the wire exchange reveals that the dialed destination telephone number is a communication request for the mobile communication network 14, the wire exchange in the public communication network 13 makes connection with the mobile exchange (not shown) in the mobile communication network 14 for transmitting the dialed destination telephone number. Then, after the mobile exchange analyzes the transmitted destination telephone number, and confirms on a registered position of a mobile subscriber with whom the communication is requested (i.e., the mobile station of the mobile subscriber 16 of the destination telephone number that the extension subscriber 11 in the private exchange network dialed), the mobile exchange calls the mobile subscriber 16 through a base station controlling the position at which the mobile station is registered. When the mobile subscriber 16 responds to the call, a response signal of the mobile subscriber 16 is generated by the mobile exchange in the mobile communication network 14, and transmitted to the private branch exchange 12 in the private exchange network through the wire exchange in the public communication network 13. According to this, a communication path is opened between the extension subscriber 11 in the private exchange network and the mobile subscriber 16 in the mobile communication network 14 for making a communication service available.

Opposite to this, when the mobile subscriber 16 registered on the mobile exchange in the mobile communication network 14 intends to make a communication with the extension subscriber 11 connected to the private branch exchange 12 in the private exchange network, a call is processed through the public communication network 13, which will be described with reference to FIG. 2B. When the mobile subscriber 16 in the mobile exchange dials a destination telephone number, the mobile exchange (not shown) in the mobile communication network 14 analyzes the dialed destination telephone number to determine whether the dialed destination telephone number is a communication request for the mobile communication network 14 (i.e., starts with a mobile telephone call number). If the dialed destination telephone number is a communication request for the mobile communication network 14, a pertinent mobile subscriber 16 in the mobile exchange is called to provide the communication service between the mobile subscribers 16. If the analysis of the destination telephone number reveals that the destination telephone number is not a communication request for the mobile communication network 14, the mobile exchange makes connection to a wire exchange in the public communication network 13 and transfers the dialed destination telephone number thereto.

Then, the wire exchange in the public communication network 13 determines whether the received destination telephone number is a communication request for the public communication network 13 or for the private exchange network. If the received destination telephone number is a communication request for the public communication network 13, the wire exchange calls a pertinent wire subscriber (not shown) and provides a communication service between the mobile subscriber 16 in the mobile communication network 14 and the wire subscriber in the public communication network 13. However, the analysis of the destination telephone number at the wire exchange reveals that the destination telephone number is a communication request for the private exchange network, the wire exchange makes connection to a pertinent private branch exchange 12 in a private exchange network and transfers the destination telephone number thereto. Next, the private branch exchange 12 analyzes the received destination telephone number, and calls the extension subscriber 11 for whom the communication request is made, i.e., the extension subscriber 11 of the destination telephone number dialed by the mobile subscriber 16 in the mobile communication network 14. When the extension subscriber 11 makes a response to the call, a response signal of the extension subscriber 11 is generated by the private branch exchange 12 in the private exchange network and transmitted to the mobile exchange in the mobile communication network 14 through the wire exchange in the public communication network 13. According to this, a communication path between the mobile subscriber 16 in the mobile communication network 14 and the extension subscriber 11 in the private exchange network is established for making a communication service available.

As described above, the related art method for processing a call between an extension subscriber in a private exchange network and a mobile subscriber in a mobile communication network has various disadvantages. In a communication in the related art between the extension subscriber of a private exchange network and a mobile subscriber of a mobile communication network, the extension subscriber to the private exchange network and the mobile subscriber to the mobile communication network process a call through a wire exchange in a public communication network, and a call processing procedure is conducted multiple times by analyzing a telephone number at respective exchanges to make the communication service available. The requirement for passing through the wire exchange in the public communication network in processing the call between the extension subscriber and the mobile subscriber increases a load on the wire exchange, makes the call processing procedure complex, and prolongs a period of time until a call is connected. In addition, the requirement for passing through the wire exchange in the public communication network results in a charge (i.e., fee) for the public communication network.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

An object of the present invention is to provide a device and a method for processing a call between a private exchange network and a mobile communication network that substantially obviates one or more of the problems caused by limitations and disadvantages of the related art.

Another object of the present invention is to provide a device and a method for processing a call between a private exchanged network and a mobile communication network in which a call processed between the private exchange network and the mobile communication network has a less complex call processing procedure.

Another object of the present invention is to provide a device and a method for processing a call between a private exchange network and a mobile communication network in which a call is processed between the private exchange network and the mobile communication network without passing through the public communication network.

Another object of the present invention is to provide a device and a method for processing a call between a private exchange network and a mobile communication network in which a call processed between the private exchange network and the mobile communication network reduces a call processing time period.

Another object of the present invention is to provide a device and a method for processing a call between a private exchange network and a mobile communication network in which a call processed between the private exchange network and the mobile communication network reduces or eliminates a telephone charge.

Another object of the present invention is to provide a device and a method for processing a call between a private exchange network and a mobile communication network in which a call processed between the private exchange network and the mobile communication network uses a wireless trunk connection system and method for using same.

To achieve at least these and other advantages in a whole or in parts and in accordance with the purpose of the present invention, as embodied and broadly described, there is provided a device that processes a call, including a private exchange network that analyzes a destination telephone number dialed by an extension subscriber of the private exchange network to request a communication network or another extension subscriber for a communication path, a wireless trunk connection system, which is coupled to the private exchange network, and a mobile communication network having a base station that calls a mobile subscriber for the destination telephone number received from the wireless trunk connection system through the base station, wherein wireless trunk connection system transmits the destination telephone number to the mobile communication network when the extension subscriber to the private exchange network requests the mobile communication network for the communication path.

To achieve at least these and other advantages in a whole or in parts and in accordance with the purpose of the present invention, as embodied and broadly described, the device for processing a call between a private exchange network and a mobile communication network includes a wireless trunk connection system having a mobile station for transmitting the destination telephone number dialed by the extension subscriber to the private exchange network to the mobile communication station through the mobile station, or the destination telephone number dialed by the mobile communication network when the extension subscriber to the private exchange network requests the mobile communication network for a communication, or the mobile station is requested for a communication from the mobile communication network.

To further achieve the above objects in a whole or in parts in other aspect of the present invention, there is provided a method for processing a call between a private exchange network and a mobile communication network including the step of transmitting a dialed destination telephone number and a call response signal through a wireless trunk connection system in the private exchange network and a wireless trunk for the mobile station connected to the wireless trunk connection system for establishing a communication path between an extension subscriber to the private exchange network and a mobile subscriber to the mobile communication network.

To further achieve the above objects in a whole or in parts in another aspect of the present invention, there is provided a method for processing a call between a private exchange network having a wireless trunk connection system, and a mobile communication network using the wireless trunk connection system that includes transmitting a dialed destination telephone number and a call response signal through the wireless trunk connection system in the private exchange network for establishing a communication path between an extension subscriber to the private exchange network and a mobile subscriber to the mobile communication network.

To further achieve the above objects in a whole or in parts in still other aspect of the present invention, there is provided a method for processing a call between a private exchange network having a wireless trunk connection system, and a mobile communication network using the wireless trunk connection system, that includes dialing the destination telephone number, wherein the mobile subscriber to the mobile communication network dials the destination telephone number, which is a prescribed extension subscriber of the private network, transmitting the destination telephone number dialed by the mobile subscriber toward the private exchange network through a wireless trunk for the first mobile station coupled to the wireless trunk connection system, and analyzing the destination telephone number upon receipt by the private exchange network, and calling the prescribed extension subscriber for establishing the communication path.

To further achieve the above objects in a whole or in parts in still another aspect of the present invention, there is provided a method for processing a call between a private exchange network having a wireless trunk connection system, and a mobile communication network using the wireless trunk connection system that includes dialing the destination telephone number, wherein the extension subscriber to the private exchange network dials the destination telephone number, which is a prescribed mobile subscriber to the mobile communication network, transmitting the destination telephone number dialed by the extension subscriber toward the mobile communication network through a wireless trunk for the first mobile station coupled to the wireless trunk connection system, and analyzing the destination telephone number upon receipt by the mobile communication network, and calling the prescribed mobile subscriber for establishing the communication path.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 2A and 2B are diagrams that illustrate related art call processing procedures between a private exchange network and a mobile communication network;

DETAILED DESCRIPTION OF PREFERRED EMBODIMENTS

Figure 1:
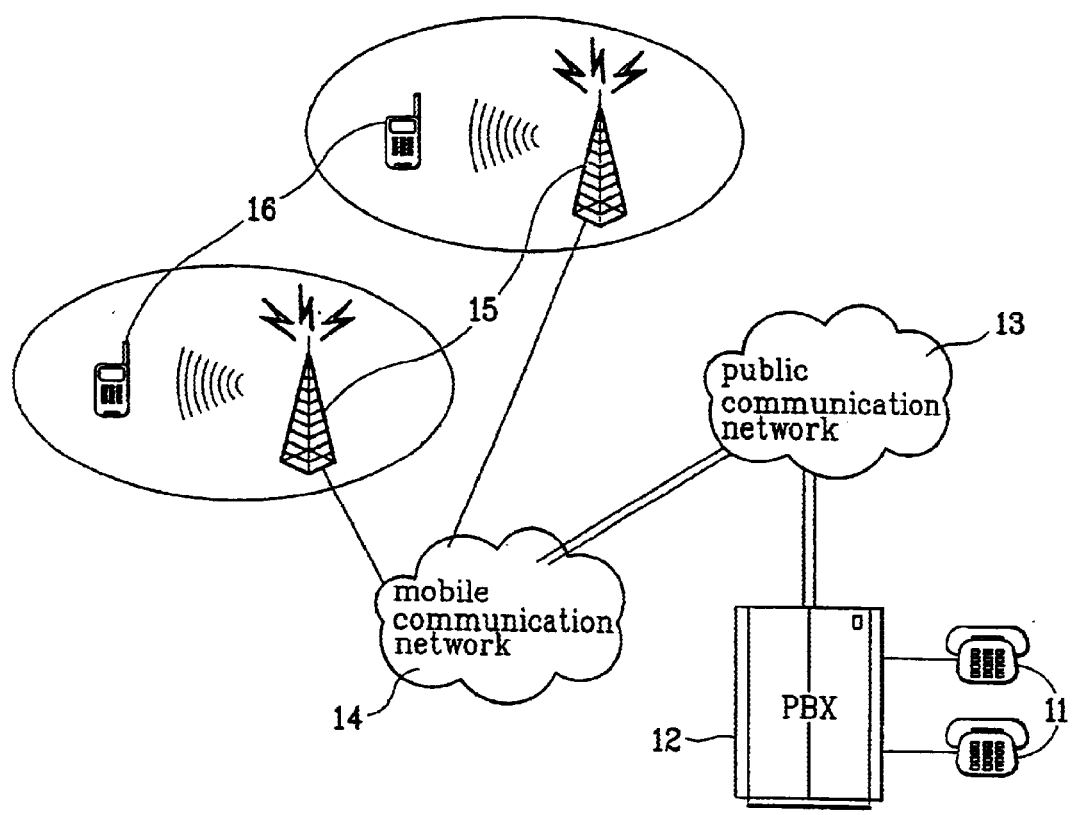
FIG. 1 is a diagram that illustrates a related art communication network inclusive of a private exchange network and a mobile communication network.
Figure 3:
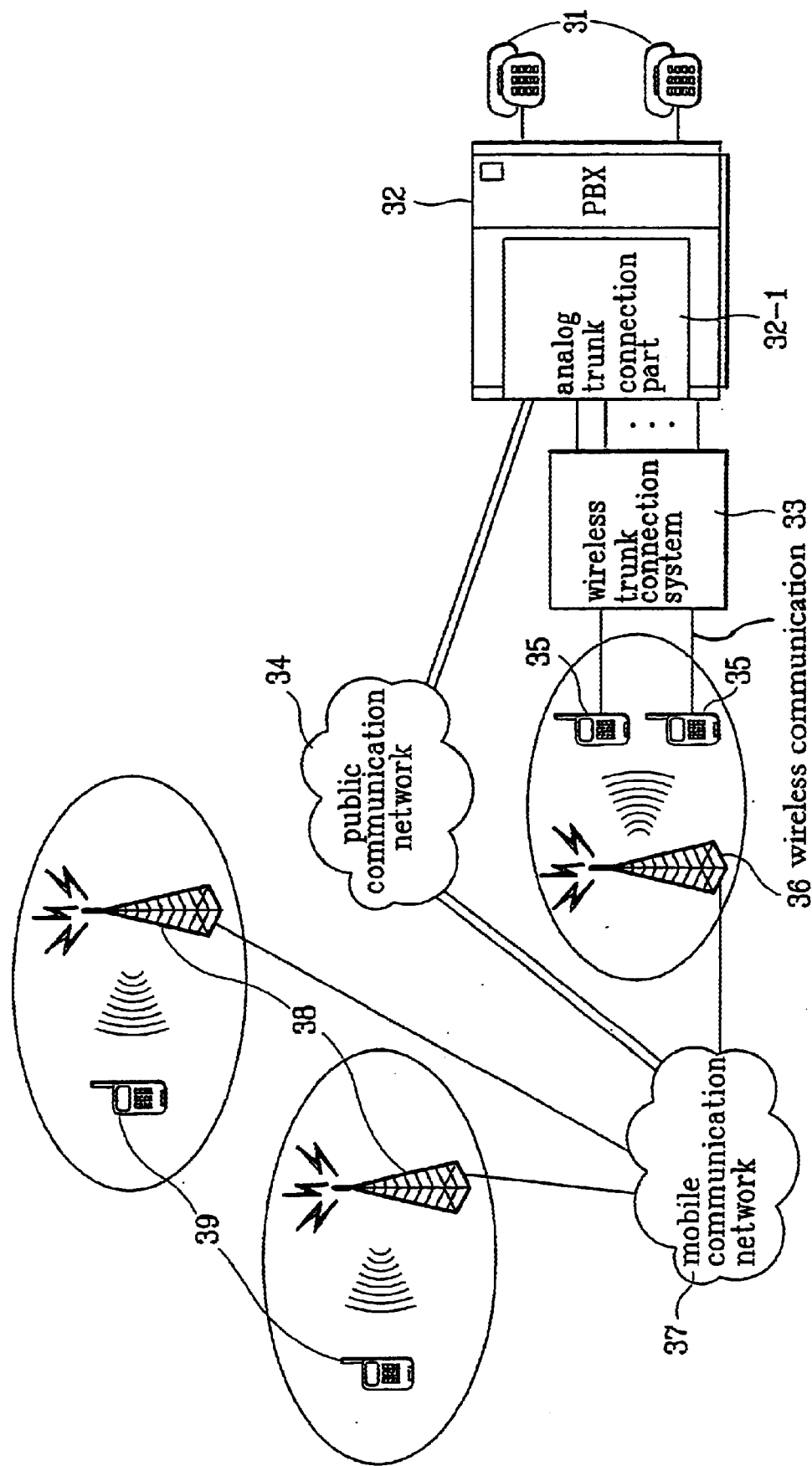
FIG. 3 is a diagram that illustrates a preferred embodiment of a communication network inclusive of a private exchange network and a mobile communication network according to the present invention.

Reference will now be made in detail to the preferred embodiments of the present invention, examples of which are illustrated in the accompanying drawings. FIG. 3 is a schematic diagram that illustrates a communication network inclusive of a private exchange network and a mobile communication network in accordance with a preferred embodiment according to the present invention.

As shown in FIG. 3, a device for processing a call between a private exchange network and a mobile communication network includes a private branch exchange 32 in a private exchange network, a wireless trunk connection system 33, a public communication network 34, and a mobile communication network 37. The private branch exchange 32 in the private exchange network is coupled to a plurality of extension subscribers 31 so that when a extension subscriber 31 dials a destination telephone number with which the extension subscriber 31 intends to communicate, the private branch exchange 32 analyzes the dialed destination telephone number and determines whether a communication path is opened to another extension subscriber 31 in the private exchange network, to the public communication network 34, or to the mobile communication network 37. When the extension subscriber 31 in the private exchange network is called from outside of the private exchange network, the private branch exchange 32 analyzes the received destination telephone number and provides a communication service to the extension subscriber 31.

The wireless trunk connection system 33 preferably includes a plurality of mobile stations 35, and is coupled to an analog trunk connection part 32-1 in the private branch exchange 32. Thus, when the private branch exchange 32 intends to request the mobile communication network for a communication path, the wireless trunk connection system 33 allows a wireless trunk for the mobile station 35 to pass the request for the mobile communication network 37 for a communication path. When the mobile communication network requests the mobile station 35 for a communication path, the wireless trunk connection system 33 allows the wireless trunk for the mobile station 35 to pass the request by receiving and transferring the signal to the private branch exchange 32. When the private branch exchange 32 or the mobile communication network 37 requests for a communication, the public communication network 34 analyzes a received destination telephone number for providing a communication service with a wire subscriber, or the private branch exchange 32 or the mobile communication network 37.

The mobile communication network 37 analyzes the destination telephone number dialed by the extension subscriber 31 from the wireless trunk connection system 33 to determine a registered position of the mobile station of the mobile subscriber 39 for the destination telephone number, and calls a mobile subscriber 39 through a base station 38 that controls the registered position of the mobile station. The mobile communication network 37 analyzes a destination telephone number dialed by the mobile subscriber 39 to provide a communication service with the public communication network 34 or the wireless trunk connection system 33.

The private branch exchange 32 preferably analyzes numerals of the destination telephone number dialed by the extension subscriber 31 only, and determines whether a communication path is established with another extension subscriber 31, whether the destination telephone number is transmitted to the wireless trunk connection system 33 through the analog trunk connection part 32-1, or whether the destination telephone number is transmitted to the public communication network 34. According to a result of the determination, the private branch exchange 32 conducts a required call processing. Thus, if a communication service with the public communication network 34 is to be provided, the communication service is provided with the public communication network 34 through a main trunk. Further, the wireless trunk connection system 33 analyzes the destination telephone number transmitted through the analog trunk connection part 32-1 in the private branch exchange, determines that the destination telephone number is a communication request to the mobile communication network 37, and transmits the destination telephone number toward the mobile communication network 37 through a wireless trunk for the mobile station 35 coupled to itself, i.e., a mobile station 35 registered on the private branch exchange.

Figure 4A:
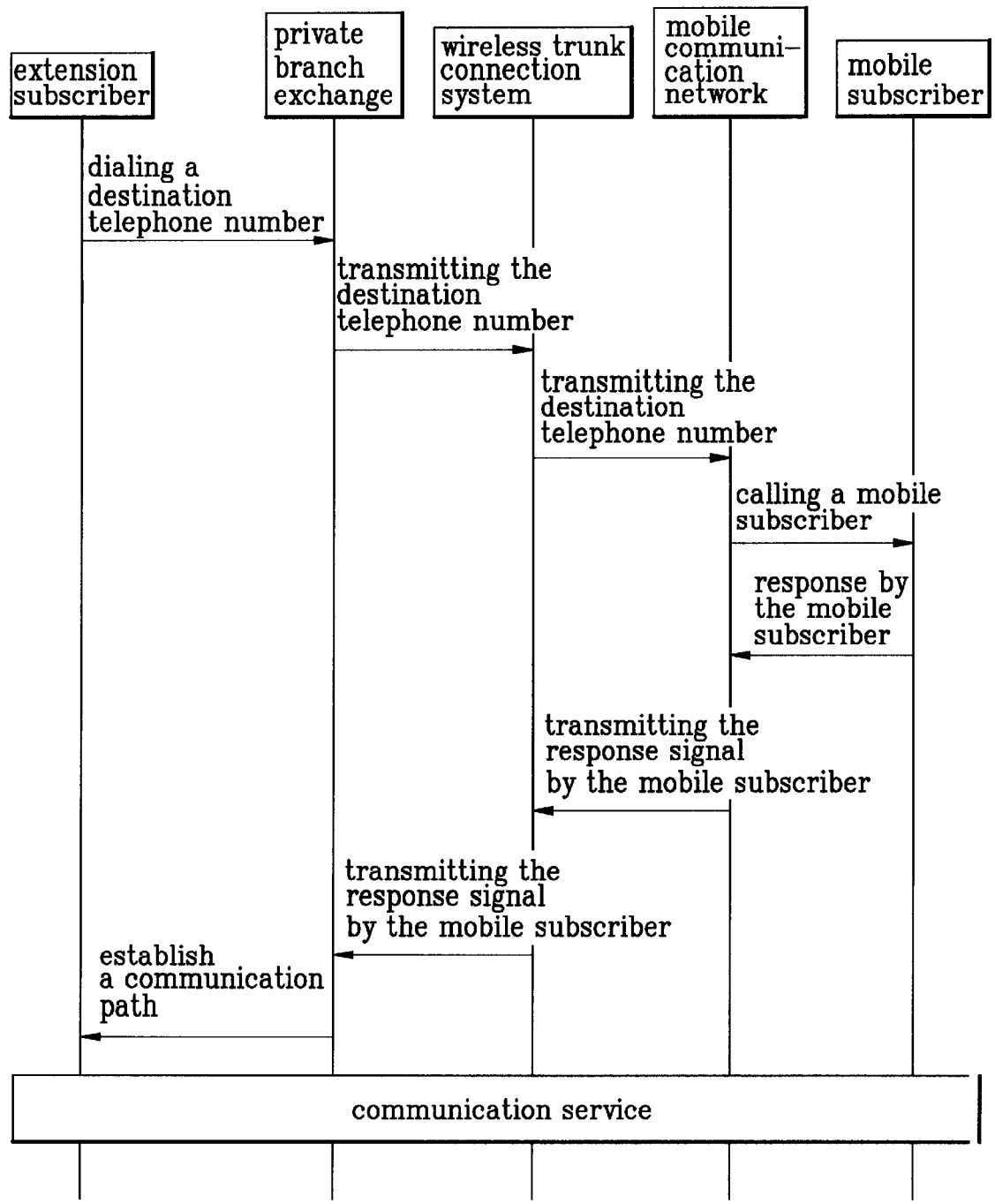
FIGS. 4A and 4B are diagrams that illustrate call processing procedures of preferred embodiments between a private exchange network and a mobile communication network using a wireless trunk connection system according to the present invention.
Figure 4B:
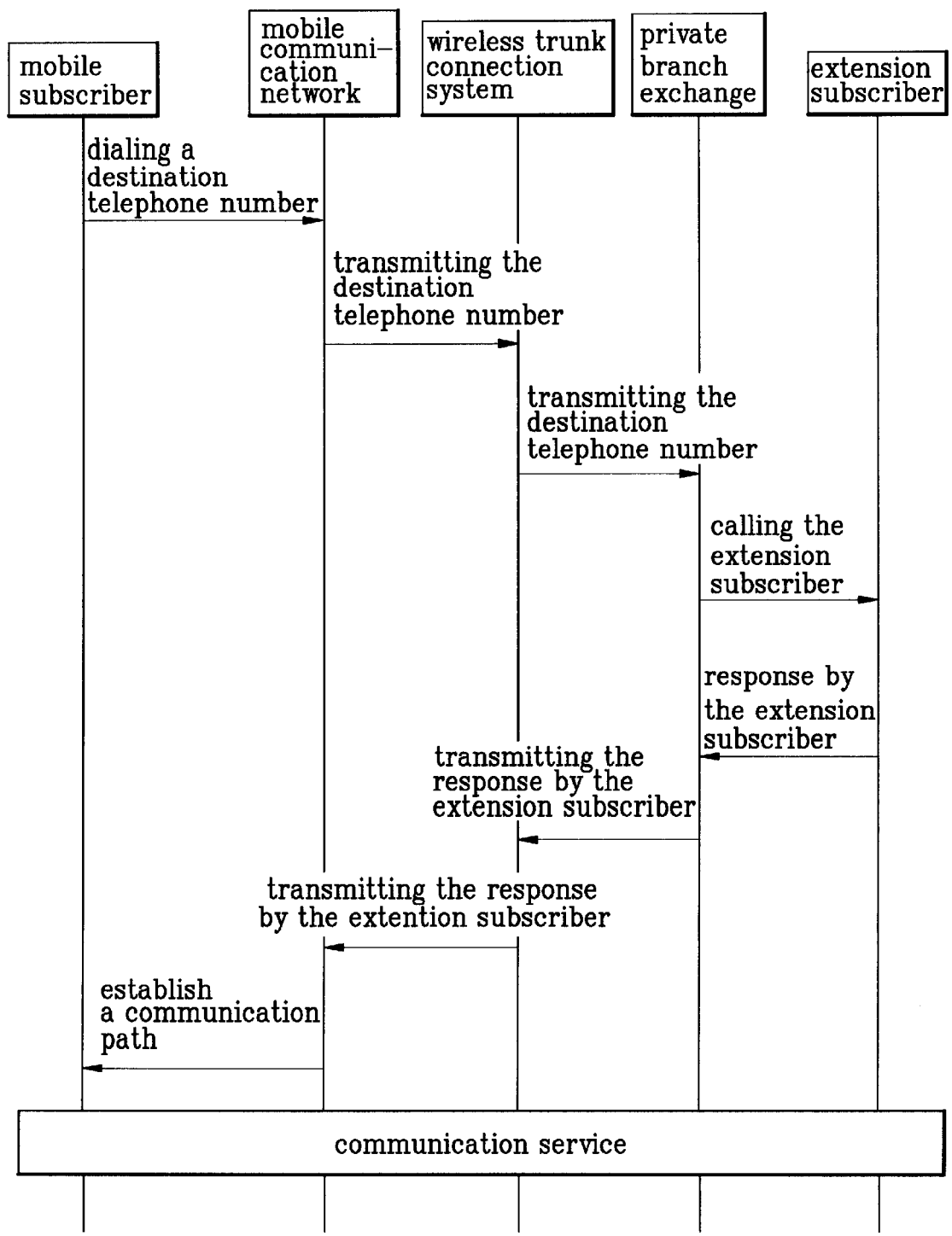

Preferred embodiments of a call processing procedure from and between a private exchange network and a mobile communication network according to the present invention using a wireless trunk connection system, for example wireless trunk connection system 33 in the aforementioned communication network, will now be described. FIGS. 4A and 4B are diagrams that illustrate call processing procedures between a private exchange network and a mobile communication network using a wireless trunk connection system in accordance with preferred embodiments. A call processing procedure when the extension subscriber 31 coupled to the private branch exchange 32 in the private exchange network intends to communicate with the mobile subscriber 39 registered on the mobile communication network 37 will now be described.

As shown in FIG. 4A, when the extension subscriber 31 of the private branch exchange 32 dials a destination telephone number with which the extension subscriber 31 intends to communicate, the private branch exchange 32 analyzes numerals of the dialed destination telephone number to determine that the dialed destination telephone number is a communication request for the private exchange network (i.e., a communication request for another extension subscriber 31 coupled to the private branch exchange 32), the public communication network, or the mobile communication network. When the destination telephone number is a communication request for the private exchange network, the private branch exchange 32 carries out a call processing procedure the same as the related art to provide a communication service with another extension subscriber 31 in the private exchange network. When the analysis of the numerals of the destination telephone number reveals that the destination telephone number is a communication request, not for the private exchange network, but for the public communication network 34, the private exchange network 32 makes connection through a main trunk with the public communication network 34, which conducts a call processing procedure the same as the related art when the destination telephone number is transmitted. Accordingly, the wire exchange (not shown) in the public communication network 34 calls the wire subscriber, and provides a communication service between the extension subscriber 31 in the private exchange network and the wire subscriber in the public communication network 34.

If the destination telephone number is a communication request for the mobile communication network 37, the private branch exchange 32 transmits the destination telephone number dialed by the extension subscriber to the wireless trunk connection system 33 through the analog trunk connection part 32-1. Then, the wireless trunk connection system 33 preferably analyzes the received destination telephone number to determine whether the received destination telephone number is a communication request for the mobile communication network 37. If the analysis of the destination telephone number reveals that the destination telephone number is a communication request for the mobile communication network 37, the wireless trunk connection system 33 transmits the destination telephone number to the base station 36 and the mobile exchange (not shown) in the mobile communication network 37 through the wireless trunk for the mobile station 35 coupled to itself. In this instance, the base station 36 of the mobile communication network 37 preferably controls the mobile stations 35 registered on the private exchange network. Accordingly, the mobile exchange analyzes the received destination telephone number again, determines a registered position of the mobile subscriber 39 of the communication request, i.e., a mobile subscriber 39 of the destination telephone number dialed by the extension subscriber 31 to the private exchange network, and calls the mobile subscriber 39 through the base station 38 that controls the registered position of the mobile station. Thereafter, when the mobile subscriber 39 responds to the call, the mobile exchange in the mobile communication network 37 generates a response signal of the mobile subscriber 39. Preferably, the response signal transmitted to the wireless trunk connection system through the base station 36 and the mobile station 35 of the private exchange network, and, therefrom to the private branch exchange 32 through the analog trunk connection part 32-1, thereby connecting the communication path between the extension subscriber 31 in the private exchange network and the mobile subscriber 39 of the mobile communication network 37, to provide a communication service. Thus, the communication service is provided from an extension subscriber in a private exchange network to a mobile subscriber in a mobile communication network without passing through a public exchange network or wire exchange.

In a preferred embodiment shown in FIG. 4B, when the mobile subscriber 39 in the mobile communication network 37 dials a destination telephone number with which the mobile subscriber 39 intends to communicate, the mobile exchange in the mobile communication network 37 analyzes the dialed destination telephone number to determine whether a communication request is for the mobile station 35 registered on the private branch exchange 32 in the private exchange network, or for another communication network. If the destination telephone number is not the communication request for the mobile station 35 registered on the private branch exchange 32 in the private exchange network (i.e., a communication request for another mobile subscriber 39 in the mobile communication network 37 or the wire subscriber to the public communication network 34), the mobile exchange preferably carries out the call processing procedure the same as the related art to provide a communication service to the mobile subscriber 39 in the mobile communication network 37.

However, if the analysis of the destination telephone number reveals that the destination telephone number is a communication request for the mobile station 35 registered on the private branch exchange 32 in the private exchange network, the mobile exchange transmits the dialed destination telephone number toward the private exchange network through the base station 36 that controls the mobile station 35 registered on the private exchange network and the wireless trunk, so that the destination telephone number is received at the private branch exchange 32 through the mobile station 35 in the private exchange network, the wireless trunk connection system 33 to which the mobile station 35 is coupled, and the analog trunk connection part 32-1. The private branch exchange 32 analyzes the received destination telephone number again, to call the extension subscriber 31 for the destination telephone number (i.e., the extension subscriber 31 for the destination telephone number dialed by the mobile subscriber 39 in the mobile communication network 37). When the extension subscriber 31 responds to the call, the private branch exchange 32 in the private exchange network generates a response signal of the extension subscriber 31, and transmits the response signal to the wireless trunk connection system 33 through the analog trunk connection part 32-1 in the private branch exchange 32. Then, the wireless trunk connection system 33 generates a response signal of the mobile station 39 corresponding to the response signal of the extension subscriber 31 for transmission to the mobile exchange in the mobile communication network 37 through the mobile station 35 and the base station 36 to open a communication path between the mobile subscriber 39 to the mobile communication network 37 and the extension subscriber 31 to the private exchange network, thereby making a communication service available. When the mobile subscriber 39 registered on the mobile exchange in the mobile communication network 37 intends to communicate with the extension subscriber 31 coupled to the private branch exchange 32 in the private exchange network in preferred embodiments, the call is processed without passing through the public communication network 34.

Alternative preferred embodiments can perform the function of transferring at least the destination phone number and the response signal by the mobile subscriber and the extension subscriber, respectively, between the private branch exchange and the mobile exchange. As described above, the mobile station 35 can be registered on the private exchange to send and/or receive information with the mobile exchange using the base station 36. However, such a transmission/reception capability, for example with a base station, could be duplicated or incorporated into the wireless trunk connection system 33. Further, within a range of the wireless trunk connection system, additional mobile stations 35 could call in as an extension subscriber or transfer networks with a dual capability to call outside the private exchange network, for example, to the base station 36 as a mobile subscriber.

As described above, preferred embodiments of a communication network including a private exchange network and a mobile communications network and methods of using the same have various advantages. In communications between an extension subscriber to a private exchange network and a mobile subscriber to a mobile communication network, the extension subscriber to the private exchange network and the mobile subscriber to the mobile communication network exchange a dialed destination telephone number and a call response signal through a wireless trunk connection system preferably coupled to the private exchange network and a wireless trunk for a mobile station coupled to the wireless trunk connection system 33 to establish a communication path and make a communication service available. Consequently, the requirement for passing through the wire exchange in the public communication network in processing the calls between the extension subscriber and the mobile subscriber can be avoided, which can decrease a load on the wire exchange, simplify a call processing procedure, and shorten a period of time until a call is connected. Moreover, the avoidance of the requirement for passing through the wire exchange in the public communication network can save a charge assessed by the public communication network.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A device that processes a call, comprising:

a private exchange network that analyzes a destination telephone number dialed by an extension subscriber of the private exchange network to request a communication network or another extension subscriber for a communication path;

a wireless trunk connection system, which is coupled to and part of the private exchange network; and a mobile communication network that calls a mobile subscriber of the mobile communication network for the destination telephone number received from the wireless trunk connection system through a base station, wherein wireless trunk connection system transmits the destination telephone number directly to the mobile communication network when the extension subscriber to the private exchange network requests the mobile communication network for the communication path, wherein a public switched telephone network is respectively connected to both of the private exchange network and the mobile contamination network, wherein when the extension subscriber of the private exchange network dials the destination telephone number, the private exchange network analyzes the destination telephone number to determine the destination telephone number as being a communication request of a prescribed mobile station that is registered on the private exchange network and controlled by the base station to allow bi-directional wireless communications between the wireless trunk connection and the base station of the mobile communication network, wherein the destination telephone number is transmitted to the mobile communication network through the base station controlling the prescribed mobile station, and the wireless trunk connection system, and wherein the mobile communication network analyzes the transmitted destination telephone number upon receipt by the mobile communication network to call the mobile subscriber for establishing the communication path.

2. The network of claim 1, wherein when a first mobile subscriber to the mobile communication network dials a first destination telephone number, the mobile communication network analyzes the first destination telephone number to determine the first destination telephone number as being a communication request of the prescribed mobile station that is registered on the private exchange network and controlled by the base station of the mobile communication network, wherein the fist destination telephone number is transmitted to the private exchange network through the base station of the mobile communication network controlling the prescribed mobile station, the prescribed mobile station, and the wireless trunk connection system, wherein the private exchange network analyzes the transmitted first destination telephone number upon receipt by the private exchange network and calls a first subscriber of the private exchange network for establishing the communication path, and wherein the public switch telephone network is directly coupled to the private exchange network by a first communication path and coupled to the mobile communication network by a second communication path, wherein a call to be connected between the public switch telephone network and a subscriber to the private exchange network is transmitted using the fist communication path, and wherein the call to be connected between the public switched telephone network and a subscriber to the mobile communication network is transmitted using the second communication path.

3. A method for processing a call between a private exchange network having a wireless trunk connection system, a mobile communication network using the wireless trunk connection system and a public communication network connected to the mobile communication network and the private exchange network, comprising:

transmitting a dialed destination telephone number and a call response signal through the wireless trunk connection system in the private exchange network for establishing a communication path between an extension subscriber to the private exchange network and a mobile subscriber to the mobile communication network, wherein orating calls from the private exchange network having destination numbers in the mobile communication network are transmitted from the private exchange network to the mobile communication network using the wireless trunk connection system, wherein the transmitting comprises:

analyzing the destination telephone number upon receipt by the mobile communication network, and calling a prescribed mobile subscriber for establishing the communication path, wherein the analyzing the destination telephone number comprises:

(a) cab the prescribed mobile subscriber through a prescribed base station controlling the prescribed mobile subscriber, (b) generating a response signal of the prescribed mobile subscriber when the prescribed mobile subscriber responds to the call, (c) transmitting the response signal of the prescribed mobile subscriber to the private branch exchange through a base station controlling a first mobile station coupled to the wireless trunk connection system, the first mobile station and the wireless trunk connection system in the private exchange network, and (d) establishing the communication path between the extension subscriber and the prescribed mobile subscriber for providing a communication service, wherein the first mobile station is registered on the private exchange network and controlled by the base station to allow bi-directional wireless communications between the wireless trunk connection system and the base station.

4. The method of claim 3, wherein the transmitting further comprises:

(a) dialing the destination telephone number, wherein the mobile subscriber to the mobile communication network dials the destination telephone number, which is a prescribed extension subscriber of the private network;

(b) transmitting the destination telephone number dialed by the mobile subscriber toward the private exchange network through a wireless trunk for the first mobile station coupled to the wireless trunk connection system; and (c) analyzing the destination telephone number upon receipt by the private exchange network, and calling the prescribed extension subscriber for establishing the communication path without using the public communication network.

5. The method of claim 3, wherein the transmitting further comprises:

(a) dialing the destination telephone number, wherein the extension subscriber to the private exchange network dials the destination telephone number, which is the prescribed mobile subscriber to the mobile communication network; and (b) transmitting the destination telephone number dialed by the extension subscriber toward the mobile communication network through the wireless trunk connection system, a wireless trunk for the first mobile station coupled to the wireless trunk connection system that is registered on the private exchange network and the mobile communication network.

6. The method of claim 5, further comprising:

(a) dialing a second destination telephone number, wherein the mobile subscriber to the mobile communication network dials the second destination telephone number, which is a prescribed extension subscriber of the private exchange network;

(b) analyzing the second destination telephone number to determine the second destination telephone number as being a communication request of the first mobile station that is registered on the private exchange network;

(c) transmitting the second destination telephone number to the private exchange network through the base station controlling the first mobile station, the first mobile station, and the wireless trunk connection system; and (d) analyzing the transmitted second destination telephone number upon receipt by the private exchange network to call the prescribed extension subscriber for establishing the communication path.

7. The method of claim 6, wherein the analyzing the transmitted second destination telephone number comprises:
   (a) calling the prescribed extension subscriber;
   (b) generating a response signal of the prescribed extension subscriber when the prescribed extension subscriber responds to the call;
   (c) transmitting the response signal of the prescribed extension subscriber to the wireless trunk connection system;
   (d) generating a response signal of the first mobile station corresponding to the response signal of the prescribed extension subscriber, and transmitting to the mobile communication network through the first mobile station and die base station controlling the first mobile station; and
   (e) establishing the communication path between the mobile subscriber and the prescribed extension subscriber for providing a communication service.

8. The method of claim 6, wherein when the mobile communication network analyzes the second destination telephone number and determines the second destination telephone number is the communication request for a public communication network, the second destination telephone number is transmitted to the public communication network for providing a communication service with a prescribed wire subscriber of the public communication network.

9. The method of claim 6, wherein when the mobile communication network analyzes the second destination telephone number and determines the second destination telephone number is the communication request for the mobile communication network, a communication service is provided with a prescribed mobile subscriber for the second destination telephone number.

10. The method of claim 5, wherein the transmitting the destination telephone number comprises:
    (a) analyzing numerals of the destination telephone number to determine the destination telephone number is a communication request for one of the private exchange network, a public communication network and the mobile communication network;
    (b) transmitting the destination telephone number to the wireless trunk connection system when the destination telephone number is the communication request for the mobile communication network; and
    (c) operating the wireless trunk connection system to transmit the destination telephone number to a corresponding base station and a mobile exchange in the mobile communication network through the wireless trunk for the first mobile station.

11. The method of claim 10, wherein when the destination telephone number is the communication request for the private exchange network, a communication service is provided with a prescribed extension subscriber of the private exchange network.

12. The method of claim 11, wherein when the destination telephone number is the communication request for the public communication network, the destination telephone number is transmitted to the public telephone network for providing a communication service with a prescribed wire subscriber of the public communication network.

13. The method of claim 3, wherein originating calls from the private exchange network having destination numbers in the public communication network do not use the wireless trunk connection system.

14. The method of claim 3, wherein transmitting calls through the wireless trunk communication system comprises using a mobile station simultaneously connected as additional mobile subscriber to the mobile communication network and an additional extension subscriber to the private exchange network.

15. A method for processing a call between a private exchange network having a wireless trunk connection system, a mobile communication network using the wireless trunk connection system and a public communication network connected to the mobile communication network and the private exchange network, comprising:
    transmitting a dialed destination telephone number and a call response signal through the wireless trunk connection system in the private exchange network for establishing a communication path between an extension subscriber to the private exchange network and a mobile subscriber to the mobile communication network;
    dialing a second destination telephone number, wherein the mobile subscriber to the mobile communication network dials the second destination telephone number, which is a prescribed extension subscriber of the private exchange network;
    analyzing the second destination telephone number to determine the second destination telephone number as being a communication request of a first mobile station that is registered on the private exchange network;
    transmitting the second destination telephone number to the private exchange network through a base station controlling the first mobile station, the first mobile station, and the wireless trunk connection system wherein the first mobile station is controlled by the base station to allow bi-directional wireless communications between the wireless trunk connection and the base station; and
    analyzing the transmitted second destination telephone number upon receipt by the private exchange network to call the prescribed extension subscriber for establishing the communication path.

16. A method for processing a call between a private exchange network having a wireless trunk connection system, a mobile communication network using the wireless trunk connection system and a public communication network connected to the mobile communication network and the private exchange network, comprising:
    transmitting a dialed destination telephone number and a call response signal through the wireless trunk connection system in the private exchange network for establishing a communication path between an extension subscriber to the private exchange network and a mobile subscriber to the mobile communication network, wherein the transmitting comprises:
    dialing the destination telephone number, wherein the extension subscriber to the private exchange network dials the destination telephone number, which is a prescribed mobile subscriber to the mobile communication network;
    transmitting the destination telephone number dialed by the extension subscriber toward the mobile communication network through a wireless trunk for a first mobile station coupled to the wireless trunk connection system;
    analyzing the destination telephone number upon receipt by the mobile communication network, and calling the prescribed mobile subscriber for establishing the communication path, wherein the analyzing the destination telephone number comprises, calling the prescribed mobile subscriber through a base station controlling a mobile station of the prescribed mobile subscriber, generating a response signal of the prescribed mobile subscriber when the prescribed mobile subscriber responds to the call, transmitting the response signal of the prescribed mobile subscriber to the private branch exchange through the base station, the first mobile station and the wireless trunk connection system in the private exchange network, and establishing the communication path between the extension subscriber and the prescribed mobile subscriber for providing a communication service.

* * * * *